(12) United States Patent
Liu et al.

(10) Patent No.: US 9,177,178 B2
(45) Date of Patent: Nov. 3, 2015

(54) RADIO FREQUENCY IDENTIFICATION CONTROL DEVICE, SYSTEM AND METHOD

(75) Inventors: Chaoyang Liu, Shenzhen (CN); Dongxing Zhao, Shenzhen (CN); Jie Chen, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 367 days.

(21) Appl. No.: 13/811,734

(22) PCT Filed: May 16, 2011

(86) PCT No.: PCT/CN2011/074128
§ 371 (c)(1),
(2), (4) Date: Jan. 23, 2013

(87) PCT Pub. No.: WO2012/019473
PCT Pub. Date: Feb. 16, 2012

(65) Prior Publication Data
US 2013/0120121 A1    May 16, 2013

(30) Foreign Application Priority Data

Aug. 13, 2010    (CN) .......................... 2010 1 0256611

(51) Int. Cl.
*G06K 7/01*    (2006.01)
*G05B 19/042*    (2006.01)
*G05B 19/14*    (2006.01)

(52) U.S. Cl.
CPC ............... *G06K 7/01* (2013.01); *G05B 19/042* (2013.01); *G05B 2219/25187* (2013.01)

(58) Field of Classification Search
CPC ......................... G06K 7/01; G05B 2219/25187
USPC .................................. 340/10.1–10.6; 455/436
See application file for complete search history.

(56) References Cited

U.S. PATENT DOCUMENTS 6,677,852 B1    1/2004 Landt
6,708,030 B1 *  3/2004 Horikawa ..................... 455/436
6,976,105 B1 * 12/2005 Wright .......................... 710/104
(Continued)

FOREIGN PATENT DOCUMENTS

CN    2859660 Y    1/2007
CN    1952950 A    4/2007
(Continued)

OTHER PUBLICATIONS

International Search Report in international application No. PCT/CN2011/074128, mailed on Aug. 25, 2011.
English Translation of the Written Opinion of the International Search Authority in international application No. PCT/CN2011/074128, mailed on Aug. 25, 2011.

*Primary Examiner* — Jennifer Mehmood
*Assistant Examiner* — Omar Casillashernandez
(74) *Attorney, Agent, or Firm* — Oppedahl Patent Law Firm LLC

(57) ABSTRACT

The disclosure provides a Radio Frequency Identification (RFID) control device, system and method. The RFID control device includes a base station controller (40). The base station controller (40) includes a base service module (402), a peripheral service module (401) and a control logic module (403), wherein the base service module (402) controls a base service device (50) and reports a control result information; the peripheral service module (401) controls a peripheral equipment (80) and reports a control result information; and the control logic module (403) receives the control result information reported by the base service module (402) and the peripheral service module (401), controls the base service device (50) through the base service module (402) and controls the peripheral equipment (80) through the peripheral service module (401) according to a control logic rule. When a use scene is changed, only the control logic rule of the control logic module (403) needs to be overwritten.

19 Claims, 4 Drawing Sheets

(56) References Cited

U.S. PATENT DOCUMENTS

| | | |
|---|---|---|
| 2004/0123036 A1* | 6/2004 | Hammitt et al. ............. 711/131 |
| 2005/0237183 A1* | 10/2005 | Lamb ....................... 340/539.11 |
| 2007/0075832 A1 | 4/2007 | Morse et al. |
| 2007/0191034 A1* | 8/2007 | Lee et al. ..................... 455/466 |
| 2009/0027162 A1 | 1/2009 | Forster |
| 2009/0265222 A1* | 10/2009 | Chatani et al. ................. 705/10 |
| 2012/0030188 A1* | 2/2012 | Gutlapalli et al. ............ 707/711 |

FOREIGN PATENT DOCUMENTS

| | | |
|---|---|---|
| CN | 201159917 Y | 12/2008 |
| CN | 101377858 A | 3/2009 |
| CN | 101510319 A | 8/2009 |
| CN | 101714263 A | 5/2010 |
| CN | 101727685 A | 6/2010 |
| CN | 101802847 A | 8/2010 |
| CN | 101943892 A | 1/2011 |

\* cited by examiner

RADIO FREQUENCY IDENTIFICATION CONTROL DEVICE, SYSTEM AND METHOD

TECHNICAL FIELD

The disclosure relates to the Radio Frequency Identification (RFID) technology, and in particular to a RFID control device, system and method.

BACKGROUND

RFID system is a non-contact automatic identification technology, including an electronic tag and a reader; the RFID technology identifies a target object automatically through a radio frequency signal and acquires related data; and the identification operation needs no manual intervention and is applicable to various severe environments. The RFID technology can identify high-speed moving objects and can identify a plurality of electronic tags simultaneously, with a fast and convenient operation.

RFID control system generally consists of an electronic tag (radio frequency electronic tag) and a reader. A certain format of electronic data is stored in the electronic tag to serve as the identification information of a to-be-identified object. Generally, the reader sends a command to the electronic tag, the electronic tag transmits the stored identification data back to the reader according to the received command of the reader. This type of communication is implemented in a non-contact mode by utilizing the space coupling of alternating magnetic field or electromagnetic field and by utilizing the modulation and demodulation techniques of radio frequency signal; that is to say, the reader sends an air interface command to the electronic tag and the electronic tag responds to the command of the reader, thereby implementing the communication between the reader and the electronic tag.

The control rule and program of an existing RFID control system are fixed and cannot be overwritten, which can be applied to one scene only; for example, the control rule order of a certain scene is fixed as: Detecting, Authenticating, LED Displaying and Barrier Opening; then the control rule order cannot be changed to be: Detecting, Authenticating, Barrier Opening and LED Displaying. If the control rule order needs to be modified, the code must be overwritten by manufacturers only; so the operation complexity is increased and inflexibility is caused.

In addition, in the existing RFID control system, several peripheral equipments are generally controlled by a single base station controller; in this way, each base station controller needs to lead out many peripheral interfaces; then, maintenance and moving are very inconvenient.

Therefore, how to implement, by the RFID control system, the flexible control on peripheral equipment, the reduction of complexity and the applicability to the usage in various scenes is the technical problem needed to be solved in the industry.

SUMMARY

The main purpose of the disclosure is to provide a RFID control device, system and method, so as to reduce the control complexity of the RFID control device and system and improve the flexibility of the RFID control device and system.

In order to achieve the purpose above, the technical scheme of the disclosure is realized as follows.

The disclosure provides a RFID control device, includes a base station controller which is connected with a base service device and peripheral equipment respectively, wherein the base station controller includes:

a base service module, which is configured to control the base service device and report a control result information;

a peripheral service module of the base station controller, which is configured to control the peripheral equipment and report a control result information;

a control logic module, which is configured to receive the control result information reported by the base service module and the peripheral service module, control the base service device through the base service module and control the peripheral equipment through the peripheral service module according to a control logic rule.

The device may further include: a peripheral controller, which is connected with the base station controller and the peripheral equipment respectively, and is configured to control the peripheral equipment using the same mode as that of the base station controller.

The peripheral controller may include:

a peripheral service module of the peripheral controller, which is configured to control the peripheral equipment and report the control result information to the control logic module;

the peripheral service module of the peripheral controller adopts the same control mode as that of the peripheral service module of the base station controller.

Both the base station controller and the peripheral controller are provided with an equipment interface connected with the peripheral equipment.

The disclosure provides a RFID control system, includes a base station controller, a base service device and peripheral equipment which are connected with the base station controller, wherein the base station controller includes:

a base service module, which is configured to control the base service device and report a control result information;

a peripheral service module of the base station controller, which is configured to control the peripheral equipment and report a control result information;

a control logic module, which is configured to receive the control result information reported by the base service module and the peripheral service module, control the base service device through the base service module and control the peripheral equipment through the peripheral service module according to a control logic rule.

The system may further include: a peripheral controller, which is connected with the base station controller and the peripheral equipment respectively, and is configured to control the peripheral equipment using the same mode as that of the base station controller.

The peripheral controller may include:

a peripheral service module of the peripheral controller, which is configured to control the peripheral equipment and report the control result information to the control logic module;

the peripheral service module of the peripheral controller adopts the same control mode as that of the peripheral service module of the base station controller.

Both the base station controller and the peripheral controller are provided with an equipment interface which can be connected with the peripheral equipment.

The system may further include: a server, which is configured to start and monitor the base station controller, and receive the control result information reported by the base service module and the peripheral service module.

The base service device may include at least one of a reader, Purchase Security Application Module (PSAM), database and real-time clock.

The disclosure provides a RFID control method, wherein three modules are divided out in a base station controller, namely, a base service module, a peripheral service module, and a control logic module of the base station controller;

wherein the base service module controls a base service device and reports a control result information; the peripheral service module of the base station controller controls a peripheral equipment and reports a control result information; and the control logic module receives the control result information reported by the base service module and the peripheral service module, controls the base service device through the base service module and controls the peripheral equipment through the peripheral service module according to a control logic rule.

The method may further include: controlling the peripheral equipment using the same mode as that of the base station controller by a peripheral controller which is connected with the base station controller and the peripheral equipment respectively.

A peripheral service module may be configured in the peripheral controller; the method may further include: controlling the peripheral equipment and reporting the control result information to the control logic module by the peripheral service module in the peripheral controller; adopting the same control mode by the peripheral service module of the base station controller and the peripheral service module in the peripheral controller.

Both the base station controller and the peripheral controller may be provided with an equipment interface connected with the peripheral equipment.

With the disclosure, the base station controller is divided into three parts which are independent from each other but are organically connected; when a use scene needs to be changed, only the control logic rule (user code) needs to be overwritten, and the base service module configured to control a base service device and the peripheral service module configured to control a peripheral equipment do not need to change programs; in this way, it is not necessary to overwrite all program codes of the entire controller; therefore, the software complexity is reduced and the software is convenient to be implemented. Moreover, several peripheral controllers can be added to control the peripheral equipment according to the requirements of actual scenes; since the peripheral controller and the base station controller use one same control mode, the software complexity is reduced and the software is convenient to be implemented. The disclosure reduces the complexity of the RFID controller and system, improves the flexibility of the RFID controller and system, and is applicable to many scenes.

DETAILED DESCRIPTION

It should be understood that the specific embodiments described here are used to illustrate the disclosure only, no to limit the disclosure.

Figure 1:
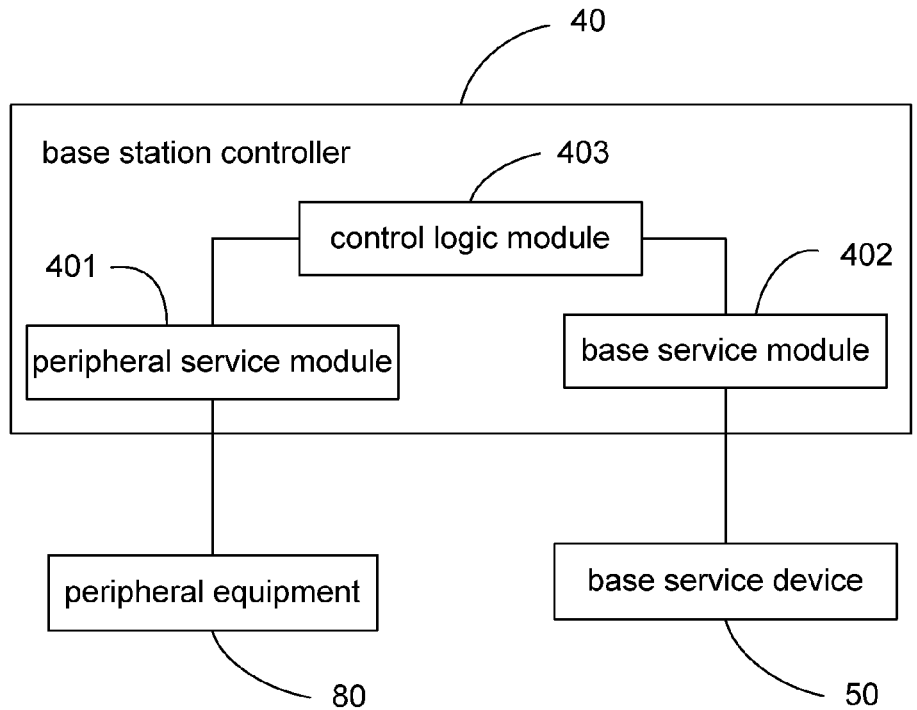
FIG. 1 shows a diagram of one embodiment of the RFID control device of the disclosure.

Referring to FIG. 1, one embodiment of the RFID control device of the disclosure is provided, which includes: a base station controller 40, which is connected with a base service device 50 and peripheral equipment 80 respectively, wherein the base service device 50 includes equipments such as a reader and the like; the base station controller 40 includes:

a base service module 402, which is configured to control the base service device 50 and to report a control result information;

a peripheral service module 401, which is configured to control the peripheral equipment 80 and to report a control result information;

a control logic module 403, which is configured to receive the control result information reported by the base service module 402 and the peripheral service module 401, control, according to a control logic rule (the control logic rule changes depending on different scenes and can be overwritten), the base service device 50 through the base service module 402 and control the peripheral equipment 80 through the peripheral service module 401.

The reader of the base service device 50 is controlled to read an electronic tag and acquire information; after the base service module 402 receives the information collected by the reader, the control logic module 403 processes the information; then the peripheral service module 401 controls the peripheral equipment 80 according to the processing result of the control logic module 403, wherein the peripheral equipment 80 may include: ground sense coil, latch, lock, LED display and the like.

The RFID control device of the disclosure divides the base station controller 40 into three modules, and the services of all the three modules must be started; when the RFID control device changes a use scene, the control mode (code) of the peripheral service module 401 and the base service module 402 does not need to change, because the control modes of the two modules when controlling different scenes are the same, thus it is only needed to change the control logic rule (program code) of the control logic module 403 according to different application scenes. For example, when the control logic rule used for controlling a vehicle lane is changed to be the control logic rule used for controlling a door way for human walking, the peripheral control order is changed, and at this moment only the control logic program needs to be overwritten; in this way, it is not necessary to overwrite all program codes of the entire base station controller, the software complexity is reduced and the software is convenient to be implemented; therefore, the complexity of the RFID control device of the disclosure is reduced, the flexibility of the RFID control device is improved, and the RFID control device can be applied to many scenes.

Figure 2:
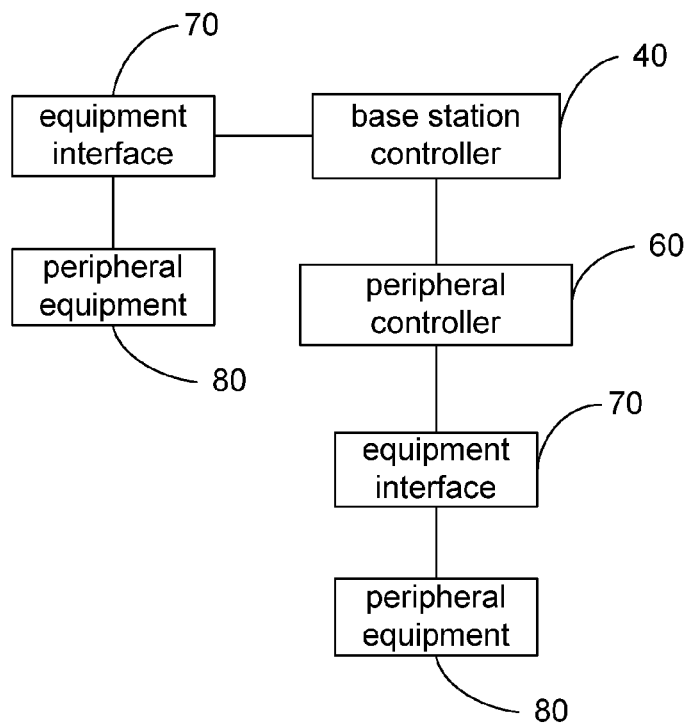
FIG. 2 shows a diagram of another embodiment of the RFID control device of the disclosure.

Referring to FIG. 2, the RFID control device can further include: a peripheral controller 60, which is connected with the base station controller 40 and the peripheral equipment 80 respectively, and is configured to control the peripheral equipment 80 using the same mode as that of the base station controller 40. The peripheral controller 60 and the base station controller 40 respectively control the peripheral equipment 80 using one same control mode.

Figure 3:
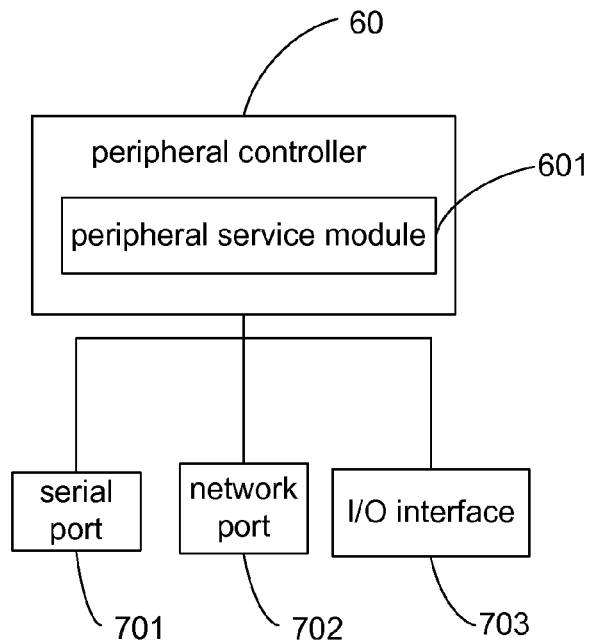
FIG. 3 shows a diagram of one embodiment of the peripheral controller of the RFID control device of the disclosure.

Referring to FIG. 3, the peripheral controller 60 includes: a peripheral service module 601, which is connected with the control logic module 403 of the base station controller 40 and is configured to control the peripheral equipment 80 according to the control logic rule of different scenes and to report a control result information to the control logic module 403 to process, so as to make the control logic module 403 control the peripheral equipment 80 through the peripheral service module 601 according to the control logic rule.

The peripheral service module 601 adopts the same control mode as that of the peripheral service module 401 of the base station controller 40, wherein the control mode generally does not need to change. The RFID control device only needs to change the control logic rule (program code) of the control logic module 403 according to different application scenes, without writing the control logic rules of the base station controller 40 and the peripheral controller 60 respectively, thus software complexity is reduced and the software is convenient to be implemented. Several peripheral controllers 60 which are connected with the base station controller 40 can be set to control the peripheral equipment 80 according to actual application scenes, which avoids that all the controlled peripheral equipment 80 are connected to the base station controller 40. If it is needed to control several peripheral equipments 80, it can be implemented through several peripheral controllers 60, so that the installation and maintenance of the entire system are more convenient and the redundant connection is simplified.

Both the peripheral service module 401 of the base station controller 40 and the peripheral service module 601 of the peripheral controller 60 are provided with an equipment interface 70 which can be connected with the peripheral equipment 80. Since several peripheral controllers 60 are provided, the equipment interfaces of the base station controller 40 can be reduced correspondingly, and several peripheral equipments 80 are connected to the peripheral controller 60. The equipment interface 70 includes: network port 702, serial port 701 and I/O interface 703, that is, General Purpose Input Output (GPIO) interface. The base station controller 40 and the peripheral controller 60 implement the connection and control on the peripheral equipment 80 through the above interface.

Figure 4:
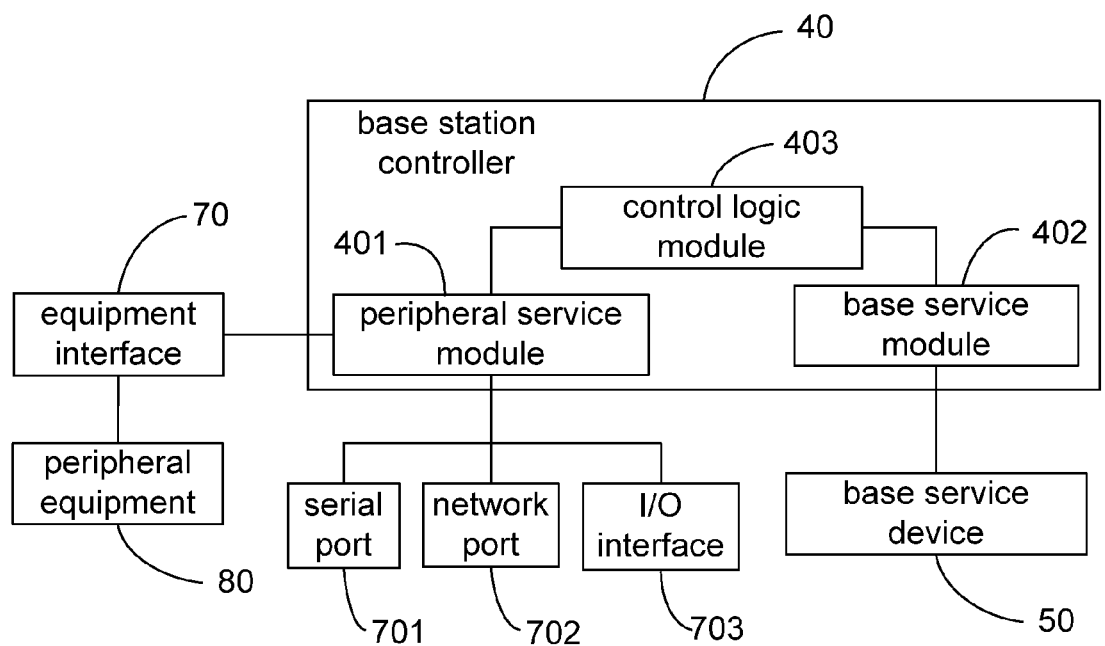
FIG. 4 shows a diagram of one embodiment of the RFID control system of the disclosure.

Referring to FIG. 4, one embodiment of the RFID control system of the disclosure is provided, which includes a base station controller 40, a base service device 50 and peripheral equipment 80 which are connected with the base station controller 40, wherein the base station controller 40 includes:

a base service module 402, which is configured to control the base service device 50 and report a control result information;

a peripheral service module 401, which is configured to control the peripheral equipment 80 and report a control result information;

a control logic module 403, which is configured to receive the control result information reported by the base service module 402 and the peripheral service module 401, control, according to a control logic rule (the control logic rule changes depending on different scenes and can be overwritten), the base service device 50 through the base service module 402 and control the peripheral equipment 80 through the peripheral service module 401.

The peripheral service module 401 of the base station controller 40 is provided with an equipment interface 70 which can be connected with the peripheral equipment 80, wherein the equipment interface 70 includes: network port 702, serial port 701 and I/O interface 703. The peripheral service module 401 of the base station controller 40 is connected with the controlled peripheral equipment 80 through these interfaces so as to control.

The RFID control system of the disclosure includes the RFID control device above. When the RFID control system changes a use scene, it is only needed to change the control logic rule (program code) of the control logic module 403, without overwriting the software program of the peripheral service module 401 and the base service module 402 of the base station controller 40; thus the complexity of overwriting the controller is reduced, the flexibility of the controller is improved and the RFID control system can be applied to many scenes.

Figure 5:
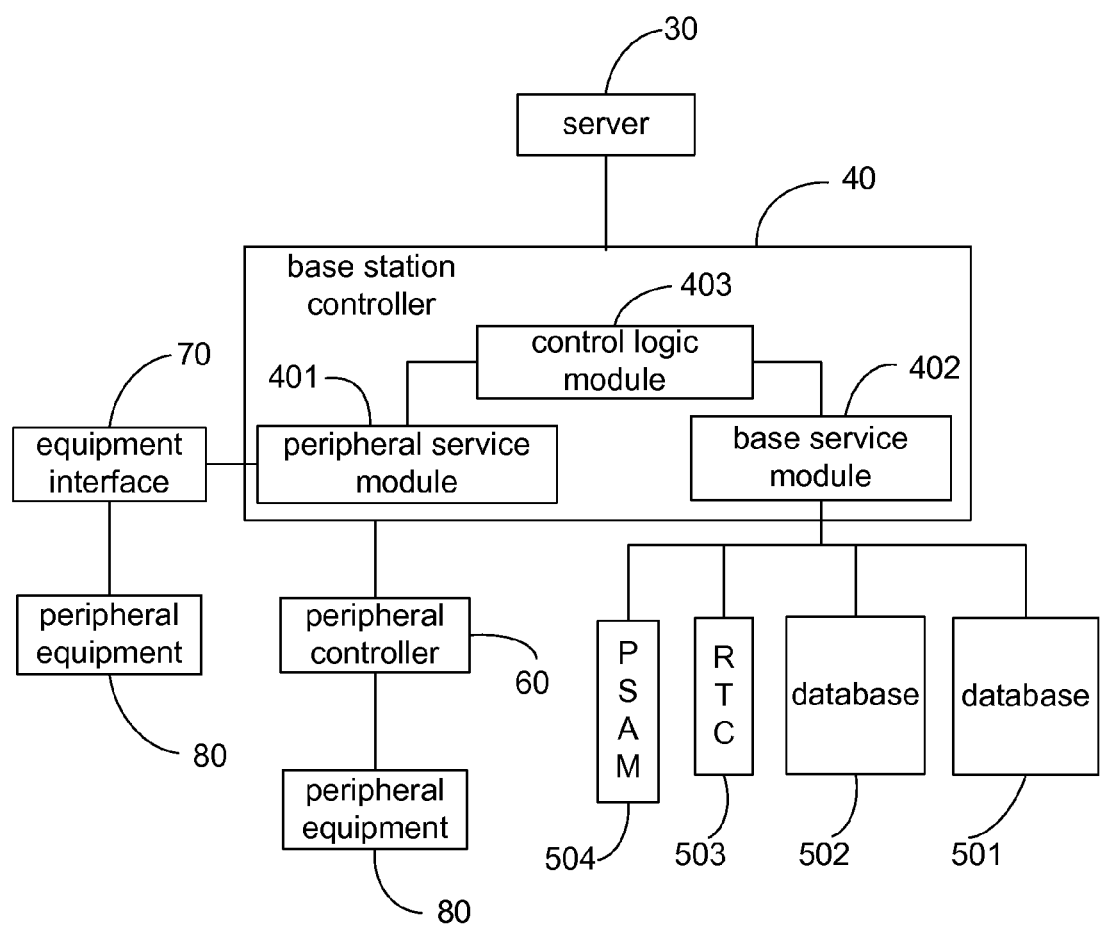
FIG. 5 shows a diagram of another embodiment of the RFID control system of the disclosure.

Referring to FIG. 5, the RFID control system above further includes: a peripheral controller 60, which is connected with the base station controller 40 and the peripheral equipment 80 respectively, and is configured to control the peripheral equipment 80 using the same mode as that of the base station controller 40.

The peripheral controller 60 includes: a peripheral service module 601, which is connected with the control logic module 403 of the base station controller 40 and is configured to control the peripheral equipment 80 according to the control logic rule of different scenes and report a control result information to the control logic module 403 to process, so as to make the control logic module 403 control the peripheral equipment 80 through the peripheral service module 601 according to the control logic rule.

The peripheral service module 601 adopts the same control mode as that of the peripheral service module 401 of the base station controller 40, wherein the control mode generally does not need to change.

The peripheral service module 601 of the peripheral controller 60 is provided with an equipment interface 70 which can be connected with the peripheral equipment 80, wherein the equipment interface 70 includes: network port 702, serial port 701 and I/O interface 703 and the like. The base service module 402 controls the baser service device 50 through the interface operation therein.

Several peripheral controllers 60 which are connected with the base station controller 40 can be set to control the peripheral equipment 80 according to actual application scenes, which avoids that all the controlled peripheral equipments 80 are connected to the base station controller 40. If it is needed to control several peripheral equipments 80, it can be implemented through several peripheral controllers 60, so that the installation and maintenance of the entire system are more convenient and the redundant connection is simplified.

The baser service device 50 includes at least one of a reader 501, Purchase Security Application Module (PSAM) 504, database 502, Real-Time Clock (RTC) 503 and the like.

The RFID control system above further includes: a server 30, which is configured to start and monitor the base station controller 40, and can receive the control result information reported by the base service module 402 and the peripheral service module 401, so as to be more convenient to monitor. The server 30 includes a Personal Computer (PC) interface, which is convenient for a user to monitor and operate.

Figure 6:
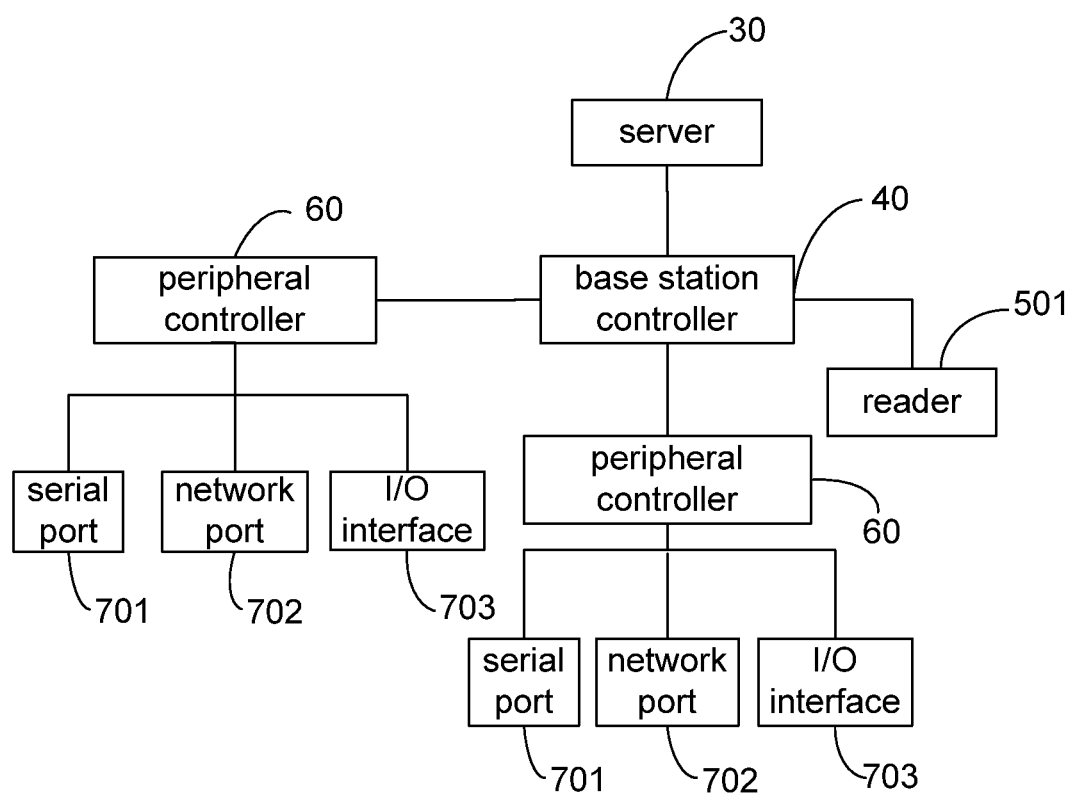
FIG. 6 shows a diagram of an application embodiment of the RFID control system of the disclosure.

A specific scene application embodiment of the lane control of the RFID control system of the disclosure can be referred to FIG. 4, FIG. 5 and FIG. 6, wherein a base station controller 40, two peripheral controllers 60 and a reader 501 are provided. Each peripheral controller 60 controls a lane, an antenna of the reader 501 corresponds to a lane.

The peripheral equipment 80 of the base station controller 40 can be a ground sense coil, a barrier, a LED display apparatus, an IP camera and the like, which are connected with the above equipment interface 70 respectively. In addition, the base station controller 40 is connected with the reader 501 through the network port 702; there are a database 502, a PSAM module 504, a RTC 503 and the like in the base station controller 40. Supposing a certain type of vehicles is allowed to pass only, generally an electronic tag is provided on the vehicle. Firstly, the base station controller 40 initiates a Detect operation to the reader 501 through the network port 702, and the reader 501 reports an operation result to the base station controller 40; then, the base station controller 40 queries through the database 502 whether the detected vehicle is allowed to pass; after authentication, if the vehicle is allowed to pass, the LED is controlled to display a Pass information and the barrier is opened; if the vehicle is not allowed to pass, the LED is controlled to display a Pass Forbidden information and the barrier is closed. In this scene, the software codes used by the base station controller 40 and the peripheral controller 60 can be written according to the following processes:

Step (1): detecting ground sense interruption by the reader 501 continuously;

Step (2): the ground sense interruption would be received when a vehicle arrives, detecting the electronic tag; if an electronic tag is detected, entering Step (3); otherwise, entering Step (4).

Step (3): accessing the database 502; authenticating, and judging whether the vehicle is legal; if the vehicle is legal, entering Step (5); otherwise, entering Step (4);

Step (4): displaying a Pass Forbidden information through a LED, which prompts that the vehicle is illegal and should bypass; then entering Step (1);

Step (5): displaying a Pass information through a LED; opening the barrier; entering Step (6);

Step (6): when the vehicle pulls out, triggering interruption by the ground sense coil; entering Step (7); otherwise, staying at Step (6);

Step (7): displaying a Pull Out information through a LED; closing the barrier; entering Step (8);

Step (8): querying the state of the barrier continuously until the barrier is completely closed; entering Step (1).

The above steps are the specific implementation of the control logic codes written through the interface function provided by the base station controller 40 and the peripheral controller 60. The detection of ground sense interruption mentioned in Step (1) and Step (6) is implemented by reading a ground sense interruption interface function; the detecting operation of the electronic tag in Step (2) is implemented through the detection interface function of the reader 501; the access to the database 502 in Step (3) is implemented through an operation function interface of the database; the LED display in Step (4), Step (5) and Step (7) is implemented by calling the interface function of the serial port 701; the barrier operation in Step (5), Step (7) and Step (8) is implemented through a GPIO interface function.

A specific scene application embodiment of the access control management of the RFID control system of the disclosure also can be referred to FIG. 4, FIG. 5 and FIG. 6, wherein a base station controller 40, two peripheral controllers 60, and two readers 501 (only one reader is shown in the figures) are provided. One peripheral controller 60 and one reader 501 control a door.

The peripheral equipment 80 includes a ground sense coil, a lock, a LED display apparatus and the like, which are connected with the above equipment interface 70 respectively, with the purpose of allowing persons satisfying conditions to pass and forbidding other persons to pass. In this scene, the software codes used by the base station controller 40 and the peripheral controller 60 can be written according to the following processes:

Step (1): detecting ground sense interruption by the reader 501 continuously;

Step (2): the ground sense interruption would be received when a person arrives, detecting the electronic tag; if an electronic tag is detected, entering Step (3); otherwise, entering Step (4).

Step (3): accessing the database 502; authenticating, and judging whether the person is a staff of the company; if the person is a staff of the company, entering Step (5); otherwise, entering Step (4);

Step (4): displaying a Pass Forbidden information through a LED; entering Step (1);

Step (5): writing the current time into a user electronic tag; entering Step (6);

Step (6): displaying a Pass information through LED; opening the latch; entering Step (7);

Step (7): when the person leaves, triggering the ground sense interruption; entering Step (8); otherwise, staying at Step (7);

Step (8): displaying a Leave information through LED; closing the latch; entering Step (9);

Step (9): querying the state of the barrier continuously until the barrier is completely closed; entering Step (1).

The above steps are the specific implementation of the control logic codes written through the interface function provided by the base station controller 40 and the peripheral controller 60. The detection of ground sense interruption in Step (1) and Step (7) is implemented by reading a ground sense interruption interface function; the detection and writing operations of the reader 501 in Step (2) and Step (5) are implemented through the interface function of the reader 501; the access to the database 502 in Step (3) is implemented through an operation function interface of the database 502; the LED display in Step (4), Step (6) and Step (8) is implemented by calling the interface function of the serial port 701; the barrier operation in Step (6), Step (8) and Step (9) is implemented through a GPIO interface function.

In conjunction with each embodiment above, it can be seen that the operation idea that can be implemented by the RFID control device and system is:

three modules are divided out in the base station controller, namely, the base service module, the peripheral service module and the control logic module, wherein the base service module controls the base service device and reports a control result information; the peripheral service module controls peripheral equipment and reports a control result information; and the control logic module receives the control result information reported by the base service module and the peripheral service module, controls the base service device through the base service module and controls the peripheral equipment through the peripheral service module according to a control logic rule.

Thus, it can be seen that in the disclosure the base station controller is divided into three parts which are independent from each other but are organically connected; when a use scene needs to be changed, only the control logic rule (user code) needs to be overwritten, and the base service module configured to control the base service device and the peripheral service module configured to control the peripheral equipment do not need to change programs; in this way, it is not necessary to overwrite all program codes of the entire controller; therefore, the software complexity is reduced and the software is convenient to be implemented. Moreover, several peripheral controllers can be added to control the peripheral equipment according to the requirements of actual scenes; since the peripheral controller and the base station controller use one same control mode, the software complexity is reduced and the software is convenient to be implemented. The disclosure reduces the complexity of the RFID controller and system, improves the flexibility of the RFID controller and system, and can be applied to many scenes.

The above are only the preferred embodiments of the disclosure and are not intended to limit the patent scope of the disclosure. Any equivalent structures or equivalent flow modifications made according to the description and the accompanying drawings of the disclosure, or any equivalent structures or equivalent flow modifications applied in other relevant technical fields directly or indirectly are deemed to be included in the patent protection scope of the disclosure.

The invention claimed is:

1. A Radio Frequency Identification (RFID) control device, comprising a base station controller which is connected with a base service device and peripheral equipment respectively, wherein the base station controller comprises:
    a base service module, which is configured to control the base service device and report a control result information;
    a peripheral service module of the base station controller, which is configured to control the peripheral equipment and report a control result information;
    a control logic module, which is configured to receive the control result information reported by the base service module and the peripheral service module, control the base service device through the base service module and control the peripheral equipment through the peripheral service module according to a control logic rule,
    wherein only the control logic rule changes with different usage scenarios of the RFID control device.

2. The device according to claim 1, further comprising:
    a peripheral controller, which is connected with the base station controller and the peripheral equipment respectively, and is configured to control the peripheral equipment using the same mode as that of the base station controller.

3. The device according to claim 2, wherein the peripheral controller comprises:
    a peripheral service module of the peripheral controller, which is configured to control the peripheral equipment and report the control result information to the control logic module;
    the peripheral service module of the peripheral controller adopts the same control mode as that of the peripheral service module of the base station controller.

4. The device according to claim 2, wherein both the base station controller and the peripheral controller are provided with an equipment interface connected with the peripheral equipment.

5. A RFID control system, comprising a base station controller, a base service device and peripheral equipment which are connected with the base station controller, wherein the base station controller comprises:
    a base service module, which is configured to control the base service device and report a control result information;
    a peripheral service module of the base station controller, which is configured to control the peripheral equipment and report a control result information;
    a control logic module, which is configured to receive the control result information reported by the base service module and the peripheral service module, control the base service device through the base service module and control the peripheral equipment through the peripheral service module according to a control logic rule,
    wherein only the control logic rule changes with a different usage scenarios of the RFID control system.

6. The system according to claim 5, further comprising:
    a peripheral controller, which is connected with the base station controller and the peripheral equipment respectively, and is configured to control the peripheral equipment using the same mode as that of the base station controller.

7. The system according to claim 6, wherein the peripheral controller comprises:
    a peripheral service module of the peripheral controller, which is configured to control the peripheral equipment and report the control result information to the control logic module;
    the peripheral service module of the peripheral controller adopts the same control mode as that of the peripheral service module of the base station controller.

8. The system according to claim 6, wherein both the base station controller and the peripheral controller are provided with an equipment interface which can be connected with the peripheral equipment.

9. The system according to claim 6, further comprising: a server, which is configured to start and monitor the base station controller, and receive the control result information reported by the base service module and the peripheral service module.

10. The system according to claim 6, wherein the base service device comprises at least one of a reader, Purchase Security Application Module (PSAM), database and real-time clock.

11. A RFID control method, wherein three modules are divided out in a base station controller, namely, a base service module, a peripheral service module and a control logic module of the base station controller;
    wherein the base service module controls a base service device and reports a control result information; the peripheral service module of the base station controller controls a peripheral equipment and reports a control result information; and the control logic module receives the control result information reported by the base service module and the peripheral service module, controls the base service device through the base service module and controls the peripheral equipment through the peripheral service module according to a control logic rule,
    wherein only the control logic rule changes with different usage scenarios of the base station controller according to the RFID control method.

12. The method according to claim 11, further comprising:
    controlling the peripheral equipment using the same mode as that of the base station controller by a peripheral controller which is connected with the base station controller and the peripheral equipment respectively.

13. The method according to claim 12, wherein a peripheral service module is configured in the peripheral controller; the method further comprises:
    controlling the peripheral equipment and reporting the control result information to the control logic module by the peripheral service module in the peripheral controller;
    adopting the same control mode by the peripheral service module of the base station controller and the peripheral service module in the peripheral controller.

14. The method according to claim 12, wherein both the base station controller and the peripheral controller are provided with an equipment interface connected with the peripheral equipment.

15. The device according to claim 3, wherein both the base station controller and the peripheral controller are provided with an equipment interface connected with the peripheral equipment.

16. The system according to claim 7, wherein both the base station controller and the peripheral controller are provided with an equipment interface which can be connected with the peripheral equipment.

17. The system according to claim 7, further comprising: a server, which is configured to start and monitor the base station controller, and receive the control result information reported by the base service module and the peripheral service module.

18. The system according to claim 7, wherein the base service device comprises at least one of a reader, Purchase Security Application Module (PSAM), database and real-time clock.

19. The method according to claim 13, wherein both the base station controller and the peripheral controller are provided with an equipment interface connected with the peripheral equipment.

* * * * *